(12) United States Patent
Chang

(10) Patent No.: US 8,020,832 B2
(45) Date of Patent: Sep. 20, 2011

(54) ANTI-SKID SLEEVE FOR MUSICAL INSTRUMENT STAND

(75) Inventor: Ming-Yi Chang, Taichung (TW)

(73) Assignee: Remarkable Company, Taichung (TW)

( * ) Notice: Subject to any disclaimer, the term of this patent is extended or adjusted under 35 U.S.C. 154(b) by 57 days.

(21) Appl. No.: 12/633,756

(22) Filed: Dec. 8, 2009

(65) Prior Publication Data

US 2011/0133043 A1    Jun. 9, 2011

(51) Int. Cl.
*F16M 3/00* (2006.01)
(52) U.S. Cl. ................................ 248/677; 248/188.9
(58) Field of Classification Search .............. 248/677, 248/188.8, 188.9, 188.4
See application file for complete search history.

(56) References Cited

U.S. PATENT DOCUMENTS

| | | | | |
|---|---|---|---|---|
| 3,199,819 A | * | 8/1965 | Widmark | 248/188.9 |
| 3,208,707 A | * | 9/1965 | Blumrich | 248/188.9 |
| 3,814,363 A | * | 6/1974 | Brelosky | 248/188.4 |
| 4,368,864 A | * | 1/1983 | Tobey | 248/188.9 |
| 6,352,234 B1 | * | 3/2002 | Liu | 248/677 |
| 6,623,082 B1 | * | 9/2003 | Huang | 248/188.9 |
| 7,270,306 B2 | * | 9/2007 | Chen | 248/188.2 |
| 2006/0068095 A1 | * | 3/2006 | Nishi et al. | 427/240 |
| 2007/0290104 A1 | * | 12/2007 | Denison et al. | 248/188.8 |
| 2010/0230562 A1 | * | 9/2010 | Fletcher et al. | 248/188.9 |

* cited by examiner

*Primary Examiner* — Ramon Ramirez
(74) *Attorney, Agent, or Firm* — Wang Law Firm, Inc.; Li K. Wang

(57) ABSTRACT

An anti-skid sleeve for a musical instrument stand comprises a body, having a containing portion formed on the top end of the body for insertion of the musical instrument stand and concavely provided on one side face of the body with a receiving portion extending toward the bottom end of the body, and two side walls formed respectively at two opposite sides of the receiving portion; a non-slip stud, having one end pivotally disposed between the two side walls of the receiving portion by a pivot assembly such that the other end of the non-slip stud may be pivotally moved between a first position in the receiving portion and a second position outside the receiving portion, and the pivot assembly able to clamp the two side walls of the receiving portion for fixing the position of the non-slip stud.

6 Claims, 5 Drawing Sheets

ANTI-SKID SLEEVE FOR MUSICAL INSTRUMENT STAND

BACKGROUND OF THE INVENTION

1. Field of the Invention

The present invention relates to a structure for a musical instrument stand, and more particularly to an anti-skid sleeve for a musical instrument stand:

2. Description of the Prior Art

A common musical instrument such as cymbals, a drum, when in use, is mounted on its dedicated musical instrument stands to provide an appropriate height for the user's performance. In order to improve the slippage of musical instrument stands in use, sleeves made of plastic or rubber material are always further fitted to the ends of musical instrument stands of the prior art. However, it is found that the sleeve made of plastic or rubber material has a disadvantage of poor non-slip effect when such sleeves are practically used in an area covered with a carpet.

Therefore, on the market, some manufacturers have developed a sleeve structure having a non-slip stud, as shown in FIG. 7. The top of a sleeve 91 is provided with a connecting piece 93 which can be connected with a musical instrument stand 92. The connecting piece 93 is formed in its interior with an accommodating space 94. A non-slip stud 95 is disposed within the accommodating space 94 and may be elastically abutted by an elastic member 96 to extend toward out of the bottom of the sleeve 91. One side of the sleeve 91 is provided with a fixed member 97 which passes through the accommodating space 94 and is propped against the non-slip stud 95 so as to fix the position where the non-slip stud 95 extends out of the bottom of the sleeve 91. However, in practical use, overloading or releasing of the fixed member 97 often results in retraction of the non-slip stud 95 into the accommodating space 94. Furthermore, when it is desired to accommodate the non-slip stud 95 in the above-described sleeve structure, the fixed member 97 must be released first and then a force is applied to the non-slip stud 95 to compress the elastic member 96 so that the non-slip stud 95 can be received into the accommodating space 94. Afterwards, the fixed member 97 is screwed again to complete the accommodation of the non-slip stud. Such operation is very cumbersome and labor consuming. Moreover, it is easy to cause the non-slip stud 95 to eject from the accommodating space and scratch the floor because of insufficiently reliable screwing of the fixed member 97.

SUMMARY OF THE INVENTION

It is the primary object of the present invention to provide an anti-skid sleeve for a musical instrument stand. The anti-skid sleeve is pivotally connected therein with a non-slip stud so that the non-slip stud when in use has a greater angle of inclination with respect to the floor and thus it is not easy to scratch the floor. When not in use, the non-slip stud can be folded and received into the interior of the anti-skid sleeve without affecting the overall appearance of the musical instrument stand.

To achieve the foregoing object, the present invention provides an anti-skid sleeve for a musical instrument stand comprising:

A body, having a containing portion formed on the top end of the body for insertion of the musical instrument stand and concavely provided on one side face of the body with a receiving portion extending toward the bottom end of the body, and two side walls formed respectively at two opposite sides of the receiving portion;

A non-slip stud, having one end pivotally disposed between the two side walls of the receiving portion by a pivot assembly such that the other end of the non-slip stud may be pivotally moved between a first position in the receiving portion and a second position outside the receiving portion, and the pivot assembly able to clamp the two side walls of the receiving portion for fixing the position of the non-slip stud.

DETAILED DESCRIPTION OF THE PREFERRED EMBODIMENTS

Figure 1:
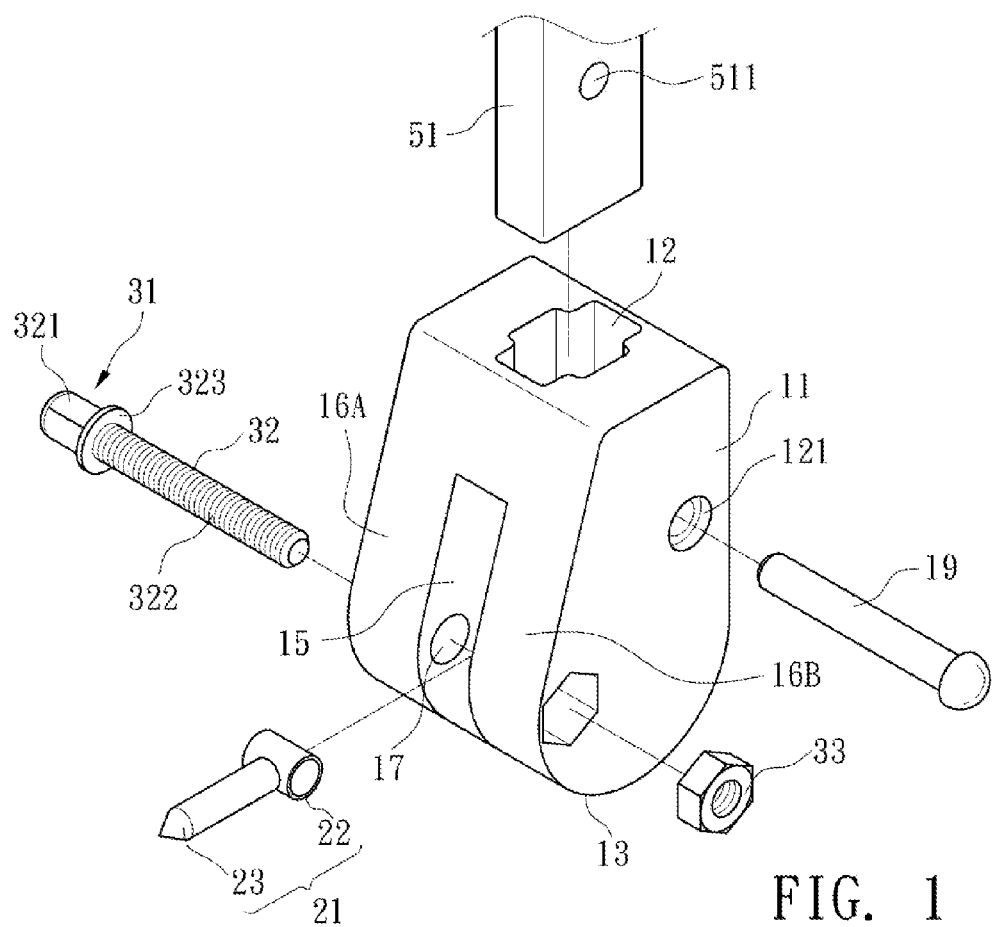
FIG. 1 is a schematic three-dimensional exploded view of the present invention.
Figure 2:
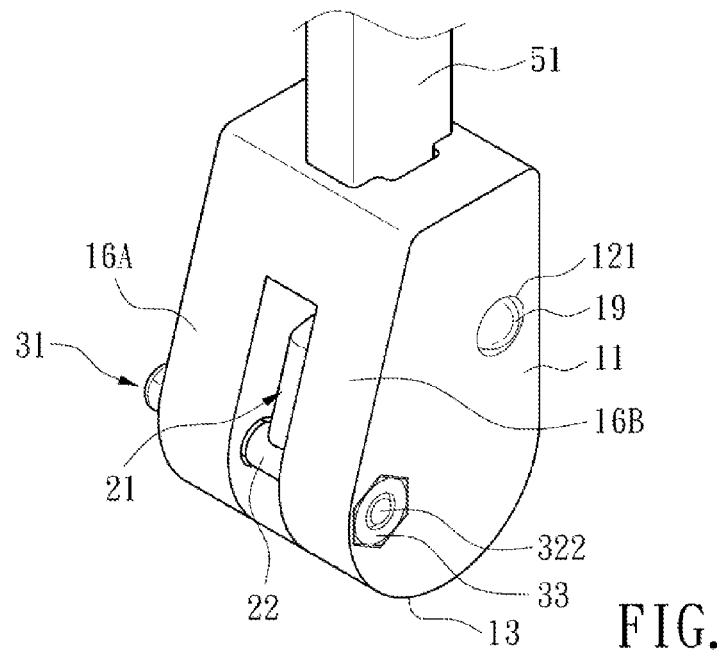
FIG. 2 is a schematic three-dimensional view of the present invention after assembled.
Figure 3:
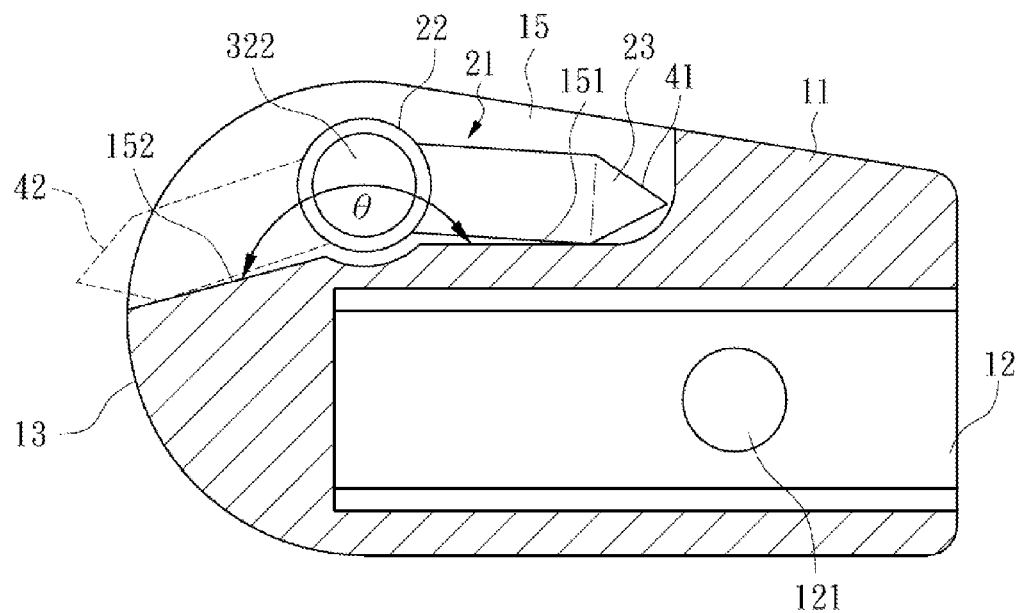
FIG. 3 is a sectional view of the present invention after assembled.
Figure 4:
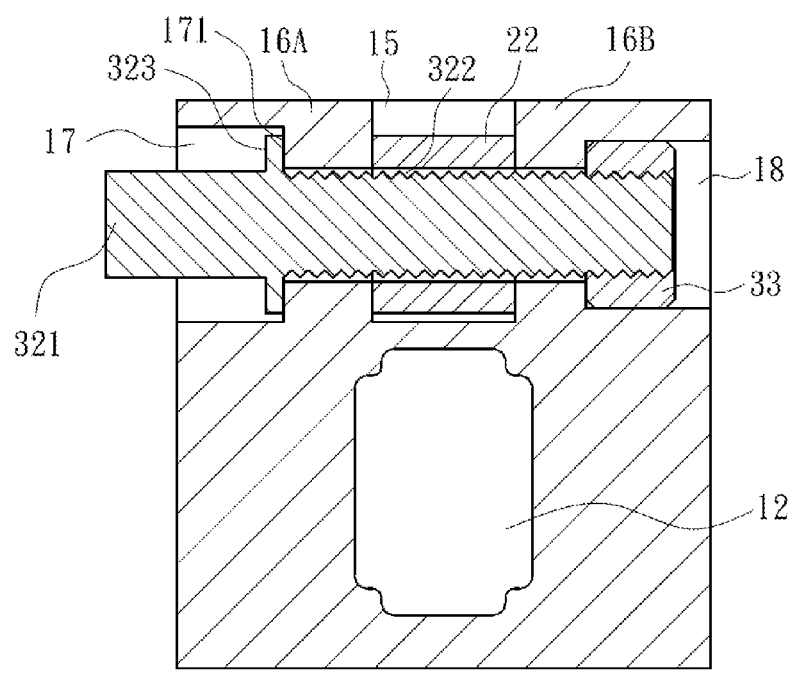
FIG. 4 is a sectional view of the present invention after assembled from another view angle.

First, referring to FIGS. 1 to 4, an anti-skid sleeve for a musical instrument stand according to the present invention is mainly comprised of a body 11, a non-slip stud 21 and a pivot assembly 31.

The body 11 has a containing portion 12 formed on the top end thereof for insertion of the musical instrument stand. The body 11 is provided on its bottom end with an arc surface 13 and is concavely provided on one side of the body 11 with a receiving portion 15 extending toward the bottom end of the body 11. Two side walls 16A, 16B are formed respectively at two opposite sides of the receiving portion 15. One side wall 16A is provided with a positioning hole 17, and the other side wall 16B is provided with a fixing hole 18. The positioning hole 17 is coaxially disposed with respect to the fixing hole 18. In this embodiment, the inner edge of the positioning hole 17 is further formed at the side near the receiving portion 15 with a propping portion 171. The fixing hole 18 is polygonal. The bottom surface of the receiving portion 15 is successively formed with a first abutting surface 151 and a second abutting surface 152 in the direction toward the bottom end of the body 11, and the included angle θ between the first abutting surface 151 and the second abutting surface 152 is greater than 180 degrees. Additionally, the body 11 is provided with a through hole 121 communicating with the containing portion 12. The musical instrument stand 51 is provided with a connection hole 511 corresponding to the through hole 121 so that a fixed member 19 can pass through both the through hole 121 and the connection hole 511 to connect the body 11 with the musical instrument stand 51 when the musical instrument stand 51 passes into the containing portion 12 of the body 11.

The non-slip stud 21 has a pivot end 22 and a conical actuating end 23 provided at the side opposite to the pivot end 22.

In this embodiment, the pivot assembly 31 is comprised of a bolt 32 and a nut 33. The bolt 32 has a head end 321 and a shaft 322. A pressing portion 323 extends outwardly from the portion between the head end 321 and the shaft 322 and is formed between the head end 321 and the shaft 322. The nut 33 is correspondingly mounted into the fixing hole 18. The nut 33 has a shape corresponding to that of the fixing hole 18 so that the nut 33 can be caught by the fixing hole 18 to limit the rotation of the nut 33. The shaft 322 of the bolt 32 of the pivot assembly 31 successively passes through the positioning hole 17 and the pivot end 22 of the non-slip stud 21. The pressing portion 323 of the bolt 32 abuts against the propping portion 171 of the positioning hole 17. The end of the shaft 322 of the bolt 32 is then screwed into the nut 33 in the fixing hole 18, whereby the non-slip stud 21 is pivotally disposed between the two side walls 16A, 16B of the receiving portion 15 so that the actuating end 23 of the non-slip stud 21 may be rotatably moved between a first position 41 in the receiving portion 15 and a second position 42 outside the receiving portion 15. When the user screws the bolt 32 tightly, the pressing portion 323 of the bolt 32 compresses the propping portion 171 of the positioning hole 17 such that the two side walls 16A, 16B of the receiving portion 15 can clamp the pivot end 22 of the non-slip stud 21 with respect to each other to fix the position of the non-slip stud 21.

When the user rotatably moves the non-slip stud 21 such that its actuating end 23 is positioned at the first position 41 and the pivot assembly 31 is securely screwed, the non-slip stud 21 can be fully folded and received into the receiving portion 15 of the body 11 without affecting the overall appearance.

Figure 5:
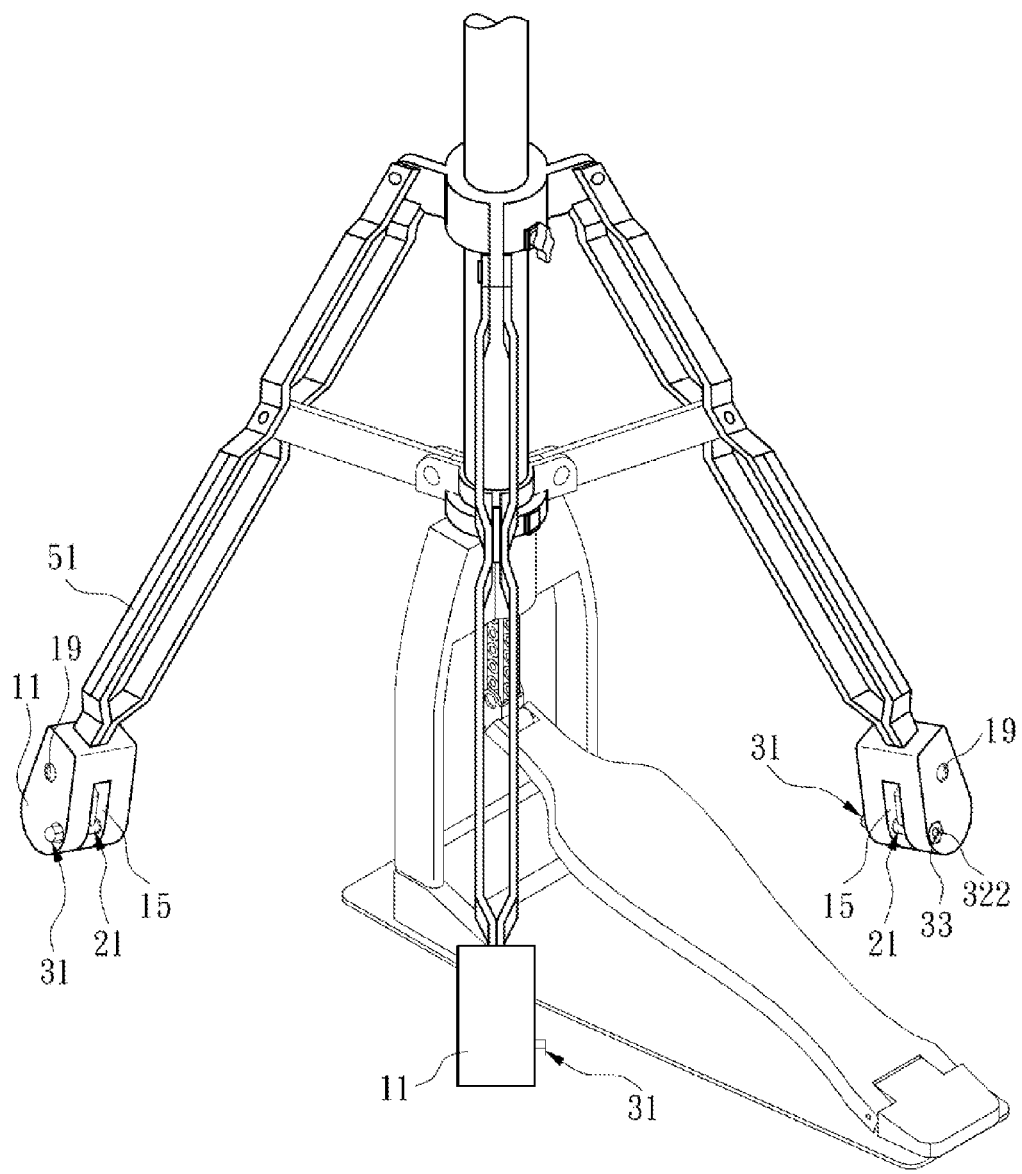
FIG. 5 is a schematic view showing a state in which a non-slip stud of the present invention is folded and received.
Figure 6:
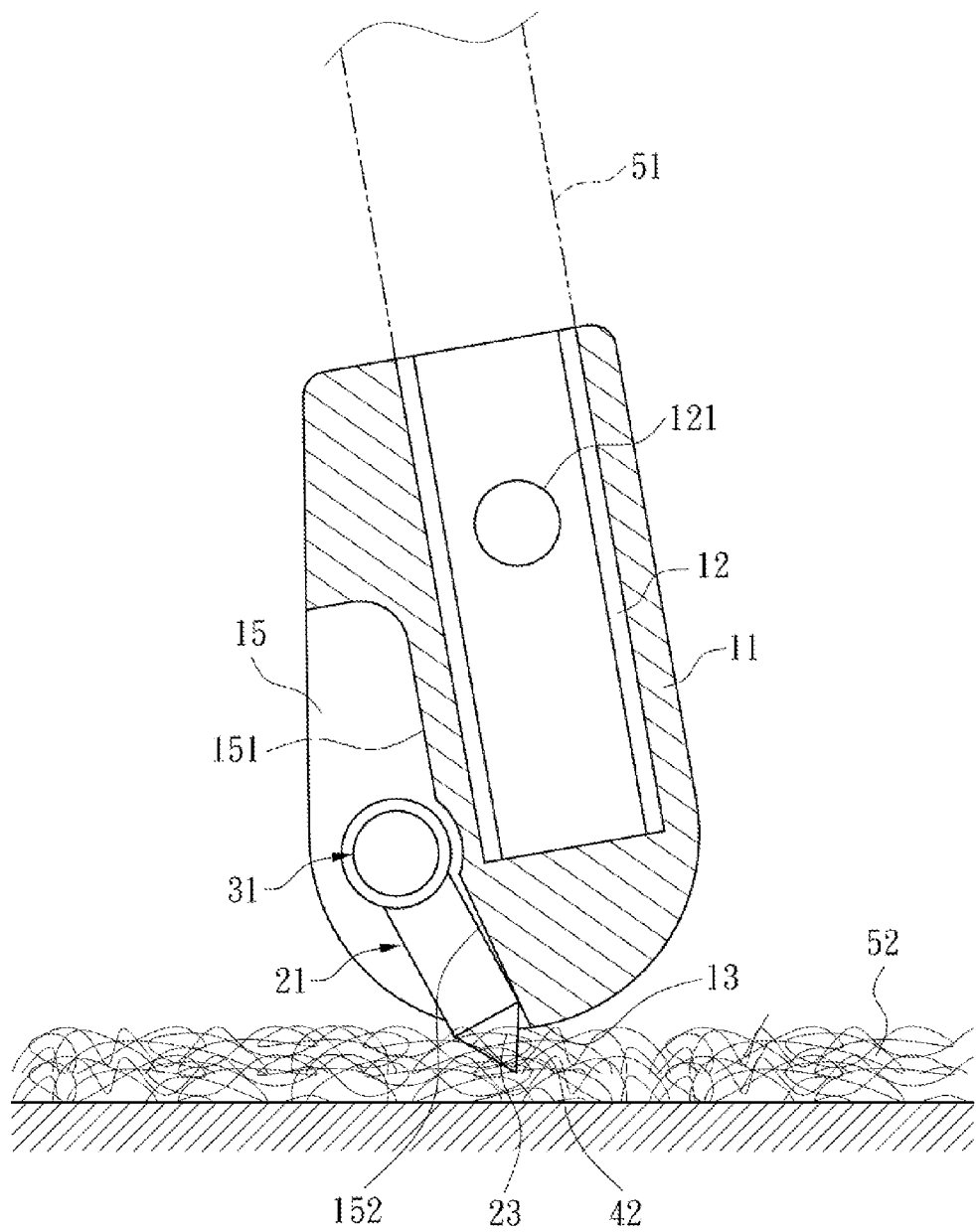
FIG. 6 is a schematic view showing a state in which a non-slip stud of the present invention is rotatably moved such that its actuating end is positioned at a second position outside the receiving portion.
Figure 7:
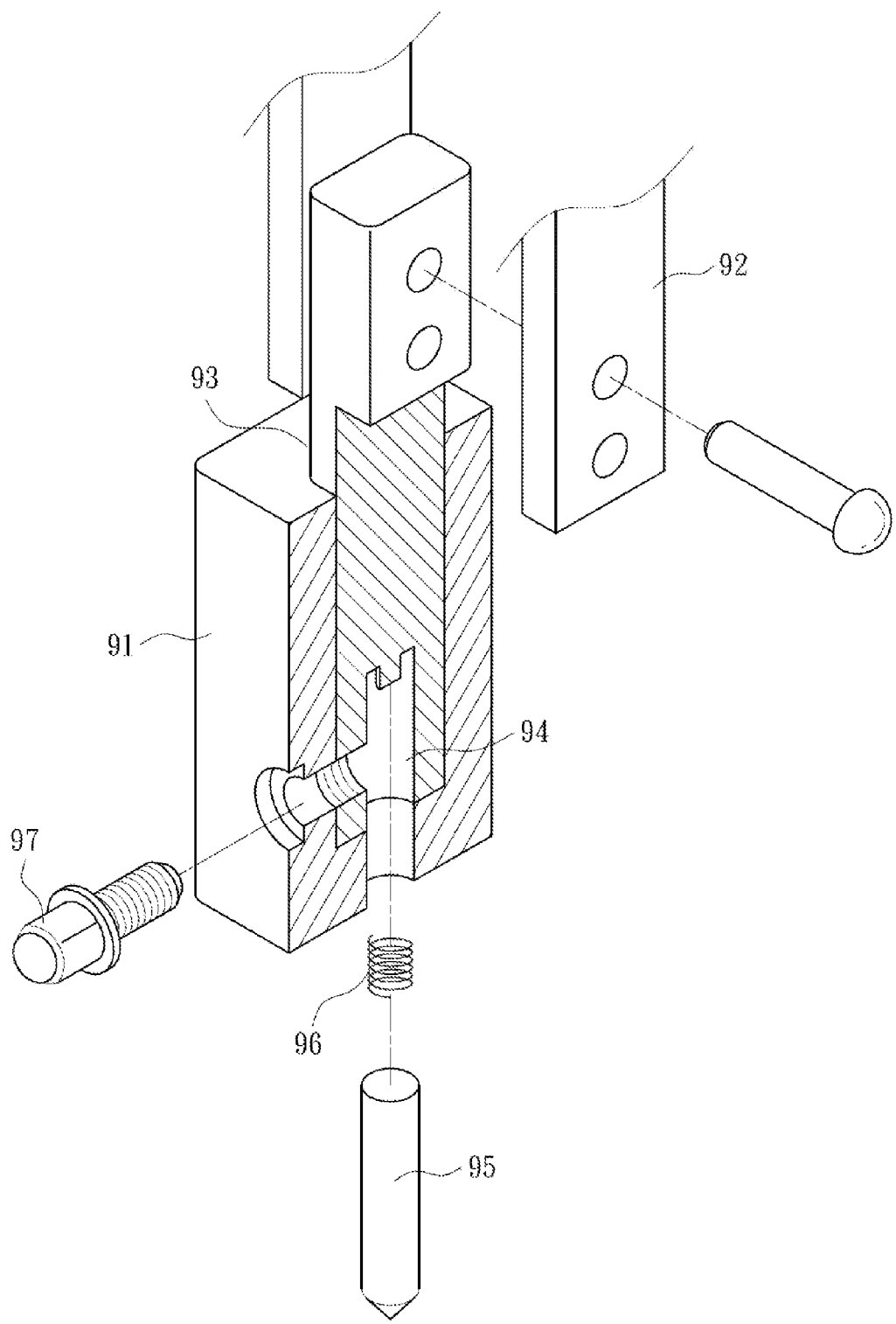
FIG. 7 is a schematic view showing a structure of a sleeve structure having a non-slip stud of the prior art.

Next, referring to FIG. 5, there is illustrated a first aspect of the present invention, in which the anti-skid sleeve of the present invention is mounted to the end of a musical instrument stand 51 such that its receiving portion 15 is disposed downwardly. When the user rotatably moves the non-slip stud 21 such that its actuating end 23 is positioned at the first position 41 in the receiving portion 15, the non-slip stud 21 abuts against the first abutting surface 151 of the receiving portion 15 and can be fully folded and received into the receiving portion 15 without affecting the appearance. Furthermore, the included angle θ between the first abutting surface 151 and the second abutting surface 152 is greater than 180 degrees. When the non-slip stud 21 is rotatably moved such that its actuating end 23 is positioned at the second position 42 outside the receiving portion 15, as shown in FIG. 6, the arc surface 13 of the body 11 abuts against the surface of the carpet 52. The non-slip stud 21 has a greater angle of inclination with respect to the floor because it abuts against the second abutting surface 152. Hence, it is not easy to damage the floor. Moreover, the non-slip stud 21 can be effectively caught in the fibers of the carpet 52, thereby effectively enhancing the non-slip effect of the anti-skid sleeve according to the present invention used in the case of the carpet 52.

The anti-skid sleeve according to the present invention, which is composed of the above-described members, may provide the following advantages:

1. According to the present invention, the receiving portion 15 of the anti-skid sleeve is pivotally connected therein with a non-slip stud 21, so that, when not in use, the non-slip stud 21 can be fully folded and received into the receiving portion 15 of the anti-skid sleeve without affecting the overall appearance of the musical instrument stand.
2. The bottom surface of the receiving portion 15 according to the present invention is successively formed of a first abutting surface 151 and a second abutting surface 152, and the included angle θ between the first abutting surface 151 and the second abutting surface 152 is greater than 180 degrees. As a result, when the non-slip stud 21 is rotatably moved to the second position 42 and abuts against the second abutting surface 152, the non-slip stud 21 will have a greater angle of inclination with respect to the floor. It is not easy to damage the carpet 52 or the floor.
3. The non-slip stud 21 can be effectively caught in the fibers of the carpet 52, thereby effectively enhancing the non-slip effect of the anti-skid sleeve according to the present invention used in the case of the carpet 52.

What is claimed is:

1. An anti-skid sleeve for a musical instrument stand, comprising:
   a body, having a bottom end and a containing portion, the containing portion being formed on the top end of the body for insertion of the musical instrument stand and concavely provided on one side of the body with a receiving portion extending toward the bottom end of the body, and two side walls formed respectively at two opposite sides of the receiving portion; and
   a non-slip stud, having one end pivotally disposed between the two side walls of the receiving portion by a pivot assembly such that the other end of the non-slip stud may be pivotally moved between a first position in the receiving portion and a second position outside the receiving portion, and the pivot assembly able to clamp the two side walls of the receiving portion for fixing the position of the non-slip stud.

2. The anti-skid sleeve for a musical instrument stand as described in claim 1, wherein the receiving portion having a bottom surface successively formed with a first abutting surface and a second abutting surface in a direction toward the bottom end of the body, the included angle between the first abutting surface and the second abutting surface is greater than 180 degrees, and the non-slip stud and the first abutting surface abut against each other when the non-slip stud is positioned at the first position, and the non-slip stud and the second abutting surface abut against each other when the non-slip stud is positioned at the second position.

3. The anti-skid sleeve for a musical instrument stand as described in claim 1, wherein the body is provided with a through hole communicating with the containing portion and the musical instrument stand is provided with a connection hole corresponding to the through hole so that a fixed member can pass through both the through hole and the connection hole to connect the body with the musical instrument stand when the musical instrument stand passes into the containing portion of the body.

4. The anti-skid sleeve for a musical instrument stand as described in claim 1, wherein the non-slip stud has a pivot end and a conical actuating end provided at the side opposite to the pivot end, and the pivot end of the non-slip stud is pivotally disposed between the two side walls of the receiving portion by a pivot assembly.

5. The anti-skid sleeve for a musical instrument stand as described in claim 4, wherein one of the two side walls is provided with a positioning hole and the other side wall is provided with a fixing hole, the positioning hole is coaxially disposed with respect to the fixing hole, the inner edge of the positioning hole is further formed at the side near the receiving portion with a propping portion, the fixing hole is polygonal, and the pivot assembly is comprised of a bolt and a nut, the bolt has a head end and a shaft, a pressing portion extends outwardly from the portion between the head end and the shaft and is formed between the head end and the shaft, the nut is correspondingly mounted into the fixing hole, the nut has a shape corresponding to that of the fixing hole for limiting the rotation of the nut, the shaft of the bolt of the pivot assembly successively passes through the positioning hole and the pivot end of the non-slip stud, the pressing portion of the bolt abuts against the propping portion of the positioning hole, and the end of the shaft of the bolt is then screwed into the nut in the fixing hole, whereby the non-slip stud is pivotally disposed between the two side walls of the receiving portion.

6. The anti-skid sleeve for a musical instrument stand as described in claim 5, wherein when the user screws the bolt tightly, the pressing portion of the bolt compresses the propping portion of the positioning hole so that the two side walls of the receiving portion can clamp the pivot end of the non-slip stud with respect to each other to fix the position of the non-slip stud.

* * * * *